United States Patent Office 3,248,644
Patented Apr. 26, 1966

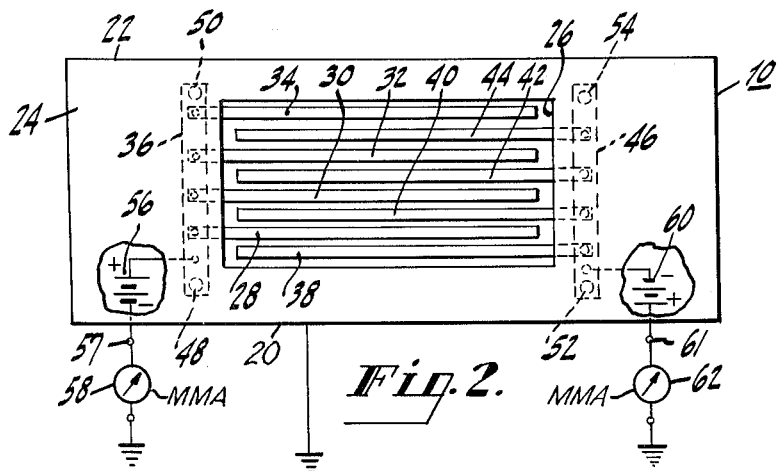
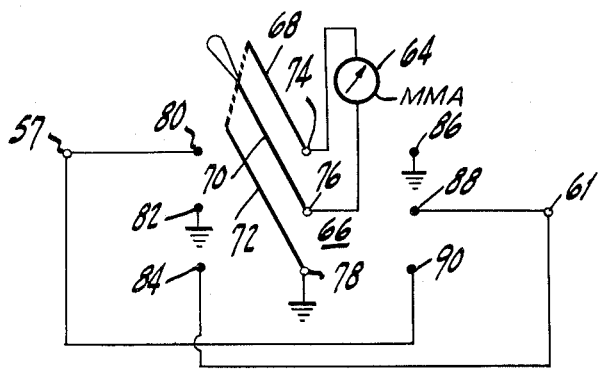
INVENTORS
CLARENCE W. HANSELL
& ALBRECHT STREIB

3,248,644
APPARATUS FOR MEASURING POSITIVE AND NEGATIVE ION CURRENTS IN THE ATMOSPHERE
Albrecht Streib and Clarence W. Hansell, Princeton, N.J., assignors to Radio Corporation of America, a corporation of Delaware
Filed Dec. 21, 1961, Ser. No. 161,123
8 Claims. (Cl. 324—33)

This invention relates generally to ion-current measuring means, and more particularly to apparatus for measuring the rates at which positive and negative ions in the atmosphere impinge upon a unit area. The ion-current measuring apparatus of the present invention is particularly useful for measuring the number of ions per unit of area that reach a patient undergoing therapeutic treatments with ionized air.

There have been many experiments performed by scientists throughout the world to determine the effects upon living things in response to treatments with artifically ionized air. Some of the evidence accumulated as a result of these experiments indicates that the therapeutic treatment of a patient with artifically ionized air, under certain controlled conditions, can bring about relief from a broad spectrum of physical, mental, and emotional diseases. For example, a predominance of negative ions in the atmosphere generally has been said to have a physically, mentally, and emotionally up-lifting effect on humans and animals. A predominance of positive ions in the atmosphere, on the other hand, has been said to have a physically, mentally, and emotionally depressive effect upon them. In performing such experiments, some of the difficulties encountered have been in measuring and monitoring accurately the concentrations of ions to which the subjects of experiments were exposed.

It has been proposed to measure the concentrations of ion currents in the atmosphere by instruments which measure the net current collected by a surface, the surface being connected to ground through an electrical current measuring instrument. While such prior art instruments measure the difference between positive and negative ion currents, they do not measure positive ion currents and negative ion currents separately and/or simultaneously. Thus, for example, such prior art ion-current measuring instruments indicate zero ion current when the positive and negative ion concentrations in the ambient atmosphere are equal to each other, even though such ion concentrations may be relatively high.

It is an object of the present invention to provide improved ion-current measuring apparatus for measuring the true negative ion current density and the true positive ion current density at a given area.

Another object of the present invention is to provide improved ion-current measuring apparatus that is adapted to measure continuously the rates at which both the positive and negative ions from an ambient atmosphere impinges upon a surface.

Still another object of the present invention is to provide ion-current measuring apparatus that has a composite surface which presents a substantially neutral, or zero, electrical potential to ions approaching it from the ambient atmosphere.

A further object of the present invention is to provide improved ion-current measuring apparatus of the type described that is relatively simple in structure, easy to operate, and highly efficient in use.

Briefly, in accordance with the present invention, the improved ion-current measuring apparatus comprises at least two, slightly spaced-apart electrodes. The electrodes are insulated from a common conductor herein called ground. An ion-current meter has one terminal connected to ground and another terminal connected to one of the electrodes through a first source of undirectional voltage. The other electrode is connected to ground through a second source of unidirectional voltage, preferably of the same value as the first source of unidirectional voltage. The electrodes are connected to opposite polarities of the first and second voltage sources, respectively, so as to present a composite, substantially neutral electric field to ions approaching the electrodes from the ambient atmosphere. The composite neutral electric field may be made more uniform by employing two sets of oppositely charged and interleaved electrodes, instead of only two electrodes, and these may be coplanar. In one embodiment of the invention, the ion current meter may be inserted in series with either one voltage source or the other in a manner to read either true positive ion current or true negative ion current. In another embodiment of the present invention, two ion current meters are used to indicate simultaneously positive ion current and negative ion current.

The novel features of the present invention, both as to its organization and methods of operation, as well as additional objects and advantages thereof, will be more readily understood from the following description, when read in connection with the accompanying drawing, in which the same reference characters designate similar parts throughout, and in which:

FIG. 1 is a front, elevational view of one form of ion-current measuring apparatus according to the present invention, certain parts being cut away to show a portion of the internal structure of ion-current measuring apparatus, FIG. 2 is a top, plan view, with parts broken away and parts represented schematically, of the ion-current measuring apparatus shown in FIG. 1; and FIG. 3 is a schematic diagram of switching means for measuring ion current with apparatus of the type shown in FIGS. 1 and 2, but employing only one ion-current indicating means.

Referring, now, particularly to FIGS. 1 and 2, there is shown apparatus 10 for measuring ion currents resulting from ions impinging upon a composite, substantially "neutral" area of the device. The apparatus 10, when in the orientation illustrated, comprises a metal housing 12 having a bottom horizontal wall 14, a pair of vertical end walls 16 and 18, a vertical front wall 20, and a vertical rear wall 22. A top wall 24 is secured to the vertical walls, by any suitable means, and is formed with a centrally located rectangular opening 26 therein. It is within the contemplation of the present invention to orient the apparatus 10 in positions other than that illustrated in FIG. 1.

Means are provided to present a composite, substantially neutral electric field to positive and negative ions directed toward the opening 26. To this end, a first set of elongated electrodes, such as electrodes 28, 30, 32 and 34 is disposed within the housing 12 and within the projected area of the opening 26. The electrodes 28–34 are arranged in a parallel, spaced-apart relationship to each other. Each of the electrodes 28–34 comprises an elongated strip of gold-plated brass, preferably rectangular in cross-secton, fixed at one of its ends by any suitable means, to a connecting bar 36 of electrically conductive material.

A second set of electrodes includes electrodes 38, 40, 42, and 44 similar to the electrodes in the first set of electrodes. Each of the electrodes 38–44 is fixed by any suitable means, adjacent to one of its ends, to a connecting bar 46 of electrically conductive material. The electrodes 38–44 are disposed in a spaced-apart, parallel relationship to each other. The bar 36 is insulated from the bottom wall 14 by a pair of stand-off insulators 48 and 50 so that the electrodes 28–34 are disposed within the projected area of the opening 26 in the top wall 24. The bar 46 is also insulated from the bottom wall 14 by a pair of stand-off insulators 52 and 54 and is disposed so that the electrodes 38–44 are interleaved and coplanar with, but separated from, the electrodes 28–34. Each of the electrodes may be formed with a bend 55 adjacent its connecting bar 36 or 46 so that the major portion of the wide surfaces of each electrode is substantially in the plane of the top wall 24.

The composite surface area presented by the interleaved electrodes within the projected area of the opening 26 is maintained substantially "neutral" by connecting one set of electrodes to a source of positive potential with respect to ground, and by connecting the other set of electrodes to a source of substantially equal negative potential with respect to ground. Thus, referring particularly to FIG. 2, the bar 36 is connected to ground (the housing 12) through a series circuit comprising a unidirectional source of potential 56 and an ion-current indicating meter 58, such as a micro-micro ammeter. The positive terminal of the voltage source 56 is connected to the bar 36, thereby maintaining the electrodes 28–34 positive with respect to ground. The bar 46 is connected to ground through a series circuit comprising a unidirectional source of potential 60 and an ion-current indicating meter 62. The negative terminal of the voltage source 60 is connected to the bar 46 to provide the electrodes 38–44 with a negative charge with respect to ground.

It is apparent that the composite electric field presented by the interleaved electrodes of the two sets of electrodes within the opening 26 will be substantially neutral when the potentials of the voltage sources 56 and 60 are the same. Although only two spaced-apart electrodes of opposite polarity with respect to ground may be used in practicing the present invention, it is apparent that a more uniform, composite, neutral area is presented by two sets of a plurality of interleaved electrodes of opposite polarity. Electrical connections to the voltage sources 56 and 60 and to the ion-current indicating meters 58 and 62 should be by means of shielded coaxial cables in order to reduce undesired ion and leakage currents to a minimum.

In operation, positive and negative ions in the atmosphere that diffuse to, or are directed toward, the composite neutral area within the opening 26 approach the interleaved electrodes 28–34 and 38–44. Each ion, as it approaches the interleaved electrodes closely enough, is repelled by an electrode having the same polarity of charge on it and is attracted to an electrode with a polarity opposite to its charge. Thus, negative ions are attracted to the electrodes 28–34, and positive ions are attracted to the electrodes 38–44. The rate at which the negative ions reach the interleaved electrodes is indicated by the negative ion-current indicating meter 58, and the rate at which the positive ions reach the electrodes 38–44 is indicated by the positive ion-current indicating meter 62. It will be observed that the positive ion current and the negative ion current may be indicated simultaneously by the meters 58 and 62.

Since the sensitivity of the ion-current measuring apparatus of the present invention depends, in part, on the sensitivity of the ion-current meters 58 and 62, and since these meters are relatively expensive, it may be desirable to use only one meter 64, as shown in FIG. 3 to do the work of two. By means of the switching circuitry shown schematically in FIG. 3, it is possible to use the meter 64 to measure either the positive ion current or the negative ion current selectively. Referring to FIG. 3, there is shown a three pole-double throw switch 66. The switch 66 comprises three movable contact members 68, 70, and 72 connected to fixed contacts 74, 76, and 78, respectively.

The meter 64 is permanently connected between the contacts 74 and 76. The contact 78 is connected to ground (housing 12). In one position of the switch 66, the movable contact members 68, 70, and 72 are adapted to engage contacts 80, 82, and 84, respectively. In a second position of the switch 66, the movable contact members 68, 70 and 72 are adapted to engage contacts 86, 88, and 90, respectively. The negative terminal 57 of the voltage source 56 is connected to the contacts 80 and 90, and the meter 58 is omitted. The positive terminal 61 of the voltage source 60 is connected to the contacts 88 and 84, and the meter 62 is omitted. The contacts 82 and 86 are grounded.

In the operation of the switching circuit shown in FIG. 3, it will be apparent that in one position of the switch 66, as when the movable contact members 68, 70, and 72 engage contacts 80, 82, and 84 respectively, the ion-current meter 64 indicates negative ion current. In the other position of the switch 66, as when the movable contact members 68, 70, and 72 engage contacts 86, 88, and 90, respectively, the ion-current meter 64 indicates positive ion current. It will be noted that the positive terminal 61 of the voltage source 60 is grounded when the meter 64 is connected to the negative terminal 57 of the voltage source 56. Also, the terminal 57 is grounded when the meter 64 is connected to the terminal 61.

From the foregoing description, it will be apparent that there has been provided improved ion-current measuring apparatus adapted to measure positive ion current and negative ion current either separately or simultaneously, one in the presence of the other without creating electric fields between the device and the room which would disturb the values of the currents of either polarity. The instrument, for example, may be laid upon the chest of a patient lying on his back in bed, so that it has upon its case the same electrical potential as the patient's body. It then can measure with good accuracy the ion currents per unit area which would flow to the patient if the instrument were removed. While portions of the ion-current measuring apparatus of the present invention have been shown in schematic form, various components useful therein, as well as variations in the apparatus itself, all coming within the spirit of this invention, will, no doubt, readily suggest themselves to those skilled in the art. Hence, it is desired that the foregoing shall be considered merely as illustrative and not in a limiting sense.

What is claimed is:

1. Ion-current measuring apparatus adapted to be exposed to the atmosphere for measuring the concentration of positive and negative ions therein, said apparatus comprising
   (a) a metal case formed with an opening in a wall thereof, said metal case comprising a common connection,
   (b) two spaced-apart electrodes having wide and narrow surfaces, said wide surfaces being disposed in a coplanar arrangement within the projected area of said opening and insulating means for supporting said electrodes with respect to said case,
   (c) an ion-current indicating device having two terminals,
   (d) means to connect one of said terminals to said case,
   (e) means to apply a first source of voltage between the other of said terminals and one of said electrodes, and
   (f) means to connect a second source of voltage between the other of said electrodes and said case, said first and said second sources being equal in voltage and being connected to said electrodes to apply voltages of opposite polarity to said two electrodes, respectively.

2. Ion-current measuring apparatus adapted to be exposed to the atmosphere for measuring the concentration of positive and negative ions therein, said apparatus comprising
   (a) a metal case formed with an opening in a wall thereof,
   (b) two spaced-apart electrodes having wide and narrow surfaces, said wide surfaces being disposed in a coplanar arrangement and being disposed within the projected area of said opening and substantially within the plane of said wall and insulators positioned between said electrodes and an inner wall of said case, (c) two ion-current indicating devices each having two terminals, (d) means to connect one of said terminals of one of said devices to said case, (e) means to apply a source of direct voltage between the other of said terminals of said one device and one of said electrodes, (f) means to connect one of said terminals of the other of said devices to said case, and (g) means to connect a second source of direct voltage between the other of said terminals of said other device and the other of said electrodes, the polarity of said one electrode being opposite to that of said other electrode.

3. Ion-current measuring apparatus adapted to be exposed to the atmosphere for measuring the concentration of positive and negative ions therein, said apparatus comprising (a) a metal cased formed with an opening in a wall thereof, (b) two sets of interleaved, spaced-apart electrodes disposed within the projected area of said opening in a coplanar arrangement and insulators positioned between said electrodes and said case, (c) an ion-current indicating meter having two terminals, (d) means to connect one of said terminals to said case, (e) means to apply a source of direct voltage between the other of said terminals and one of said sets of electrodes, and (f) means to connect a second source of direct voltage between the other of said sets of electrodes and said case, said first and second sources of voltage being of substantially the same amplitude and the polarity of said one set of electrodes being opposite to that of said other set of electrodes.

4. Ion-current measuring apparatus adapted to be exposed to the atmosphere for measuring the concentration of positive and negative ions therein, said apparatus comprising (a) a first set of elongated electrodes, (b) a second set of elongated electrodes, (c) first means supporting said first set of electrodes in a parallel, spaced-apart relationship, (d) second means supporting said second set of electrodes in a parallel, spaced-apart relationship, (e) means fixing said first and said second means to dispose said electrodes of said first and second sets in an interleaved, spaced-apart relationship, (f) first and second ion-current meters each having a positive and a negative terminal, (g) a common conductor comprising a common connection, (h) means connecting said positive terminal of said first meter to said common conductor, (i) means for applying a first source of unidirectional voltage with its positive terminal in contact with said first means and its negative terminal in contact with said negative terminal of said first meter, (j) means connecting said negative terminal of said second meter to said common conductor, and (k) means for connecting a second source of unidirectional voltage with its negative terminal connected to said second means and its positive terminal connected to said positive terminal of said second meter.

5. Ion-current measuring apparatus adapted to be exposed to the atmosphere for measuring the concentration of positive and negative ions therein, said apparatus comprising (a) a first set of electrodes, (b) a second set of electrodes, (c) means interleaving said electrodes of said first set among said electrodes of said second set in a spaced-apart relationship, (d) an ion-current measuring meter, (e) first and second sources of direct voltage, (f) a common conductor comprising a common connection, (g) two-position switching means,
   (1) said switching means being adapted, in a first position thereof, to connect:
      (a) one of said terminals of said meter to said common conductor,
      (b) said first source of direct voltage between the other terminal of said meter and each of said electrodes of said first set,
      (c) said second set of electrodes to said common conductor through said second source of direct voltage, the polarity of said first set of electrodes being opposite to said second set of electrodes, and
   (2) said switching means being adapted, in a second position thereof, to connect:
      (a) said other terminals of said meter to said common conductor,
      (b) said one terminal of said meter to said second set of electrodes through said second source of direct voltage, and
      (c) said first source of direct voltage between said common conductor and said first set of electrodes, the polarity of said first set of electrodes being opposite to that of said second set of electrodes.

6. Apparatus for measuring positive ion current and negative ion current simultaneously, said apparatus adapted to be exposed to the atmosphere comprising (a) an electrical conductor comprising a common connection, (b) a first set of metal strips, (c) means electrically connecting each of said metal strips to each other in a spaced-apart, parallel, coplanar arrangement, (d) a second set of metal strips, (e) means electrically connecting each of said metal strips of said second set to each other in a spaced-apart, parallel, coplanar arrangement, (f) means disposing said first and said second metal strips in an interleaved, coplanar, spaced-apart arrangement for exposing said metal strips to the atmosphere, (g) a positive ion-current meter and a negative ion-current meter, (h) means connecting one terminal of said negative ion-current meter to said common connection, (i) means for applying a first source of direct voltage between said first set of metal strips and another terminal of said negative ion-current meter, (j) means connecting one terminal of said positive ion-current meter to said common connection, and (k) means for connecting a second source of direct voltage between said second set of metal strips and another terminal of said positive ion-current meter, the polarity of said first set of metal strips being opposite to that of said second set of metal strips when said first and said second direct voltage sources are connected, said first and said second sets of metal strips being spaced from said common connection and from each other.

7. Ion-current measuring apparatus adapted to be exposed to the atmosphere for measuring the concentration of positive and negative ions therein, said apparatus comprising (a) a common electrical conductor comprising a common connection, (b) two spaced-apart electrodes having wide and narrow surfaces, said wide surfaces being disposed in a coplanar arrangement and insulators positioned between said electrodes and said common connection,
(c) an ion-current indicating device having two terminals,
(d) first and second sources of direct voltage,
(e) means to connect said ion-current indicating device and said first source of voltage in series with each other and between one of said electrodes and said common connection, and
(f) means to connect said second source of voltage between the other of said electrodes and said common connection, said first and said second sources of voltage being connected so that said electrodes are of opposite polarity with respect to each other.

8. Ion-current measuring apparatus adapted to be exposed to the atmosphere for measuring the concentration of positive and negative ions therein, said apparatus comprising
(a) a common electrical conductor comprising a common connection,
(b) two spaced-apart electrodes having wide and narrow surfaces, said wide surfaces being disposed in a substantially coplanar arrangement and insulating means for supporting said electrodes on said common connection,
(c) first and second ion-current meters,
(d) first and second direct voltage sources,
(e) means to connect said first meter and said first voltage source in series between said common connection and one of said electrodes, and
(f) means to connect said second voltage source and said second meter in series between said common connection and the other of said electrodes, said voltage sources being connected so that the polarity of said one electrode is opposite to that of said other electrode.

References Cited by the Examiner

UNITED STATES PATENTS

| | | | |
|---|---|---|---|
| 2,125,992 | 8/1938 | Collings | 324—98 X |
| 2,349,992 | 5/1944 | Schrader | 324—61 X |
| 2,408,051 | 9/1946 | Donelian | 340—237 |
| 2,820,946 | 1/1958 | Robinson | 324—33 |

WALTER L. CARLSON, *Primary Examiner.*

JAMES W. LAWRENCE, *Examiner.*